W. A. KILMER.
MACHINE FOR MAKING WIRE FABRIC.
APPLICATION FILED NOV. 29, 1909.

1,076,831.

Patented Oct. 28, 1913.
18 SHEETS—SHEET 1.

WITNESSES

INVENTOR
W. A. Kilmer

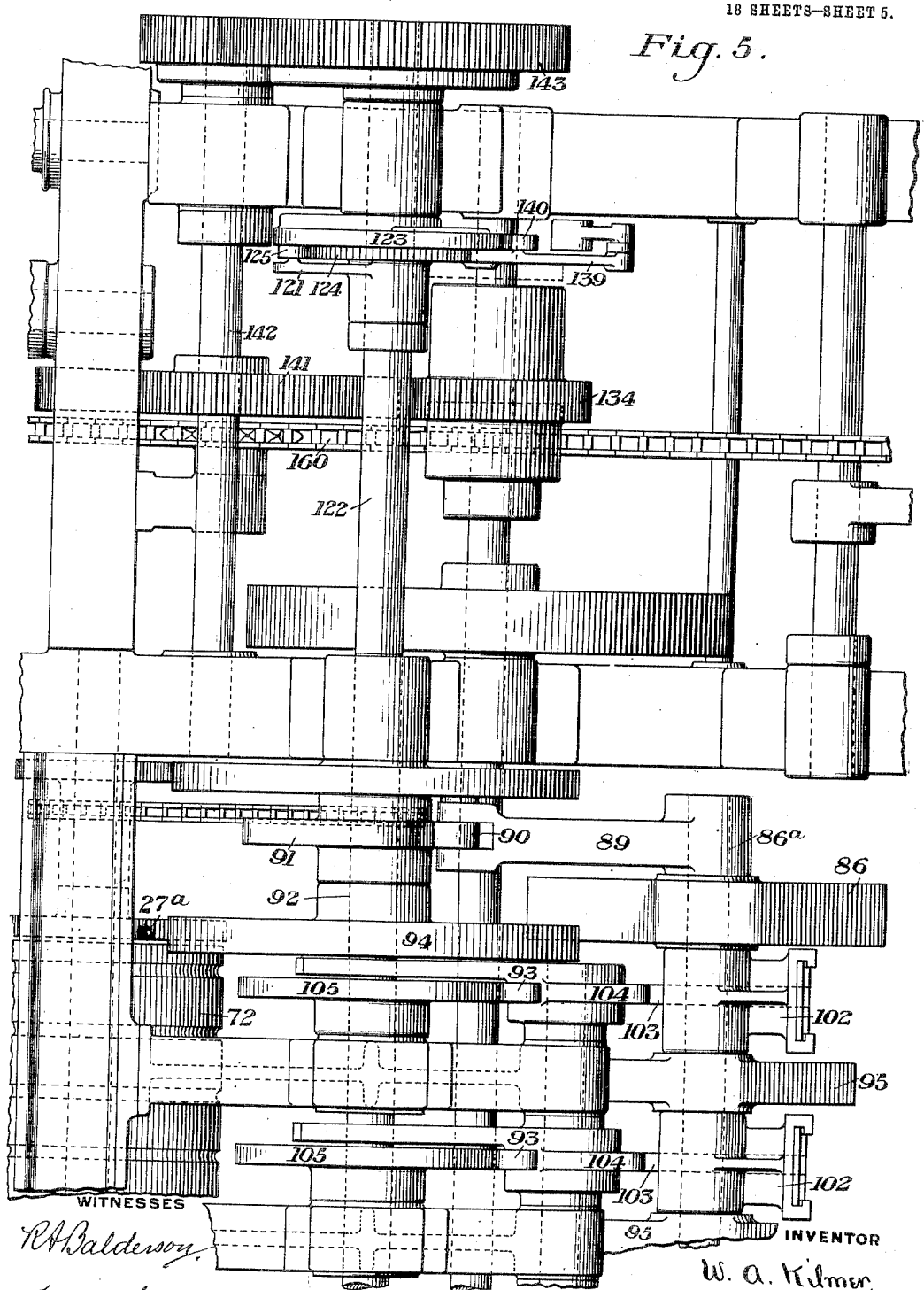

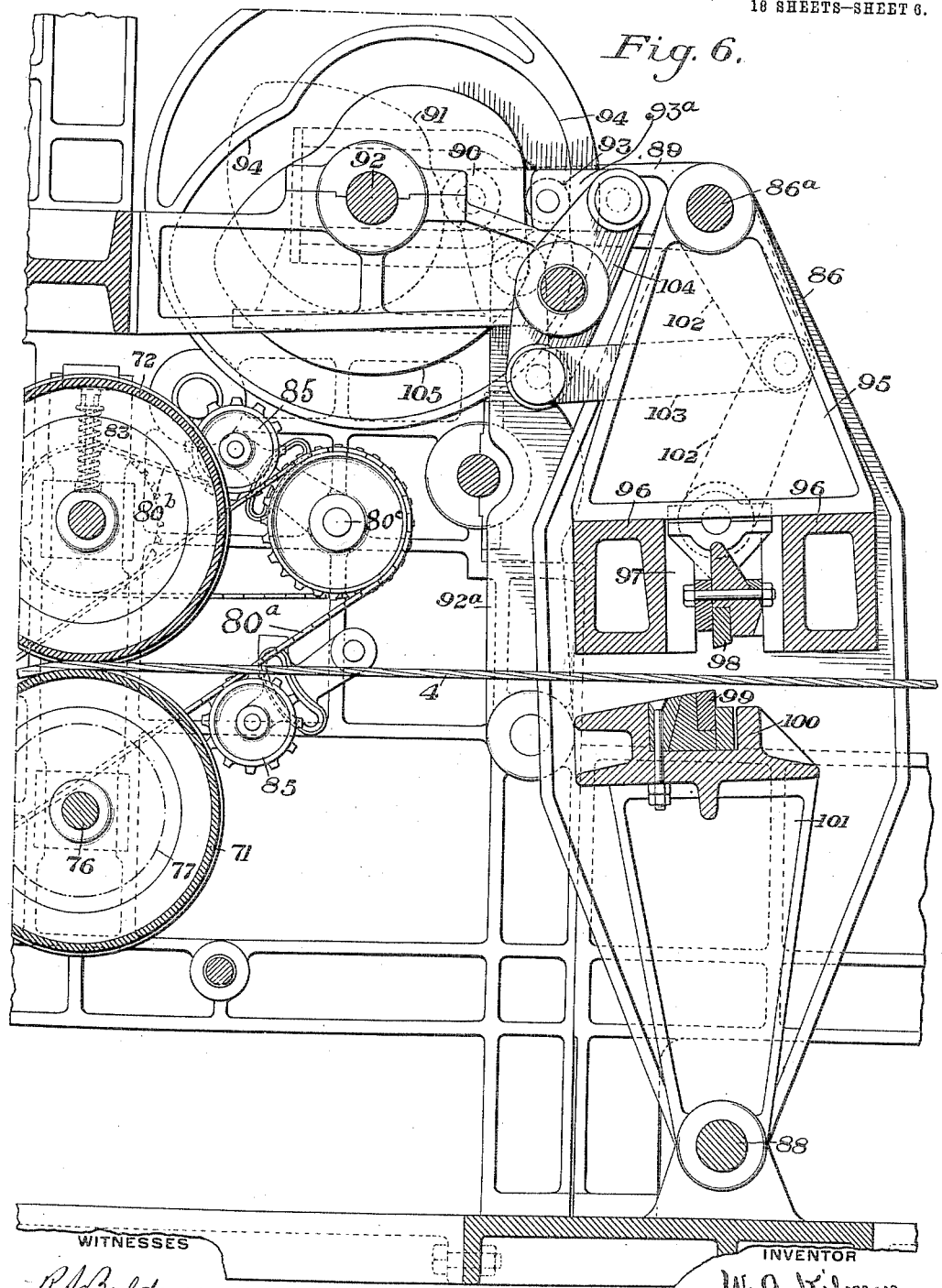

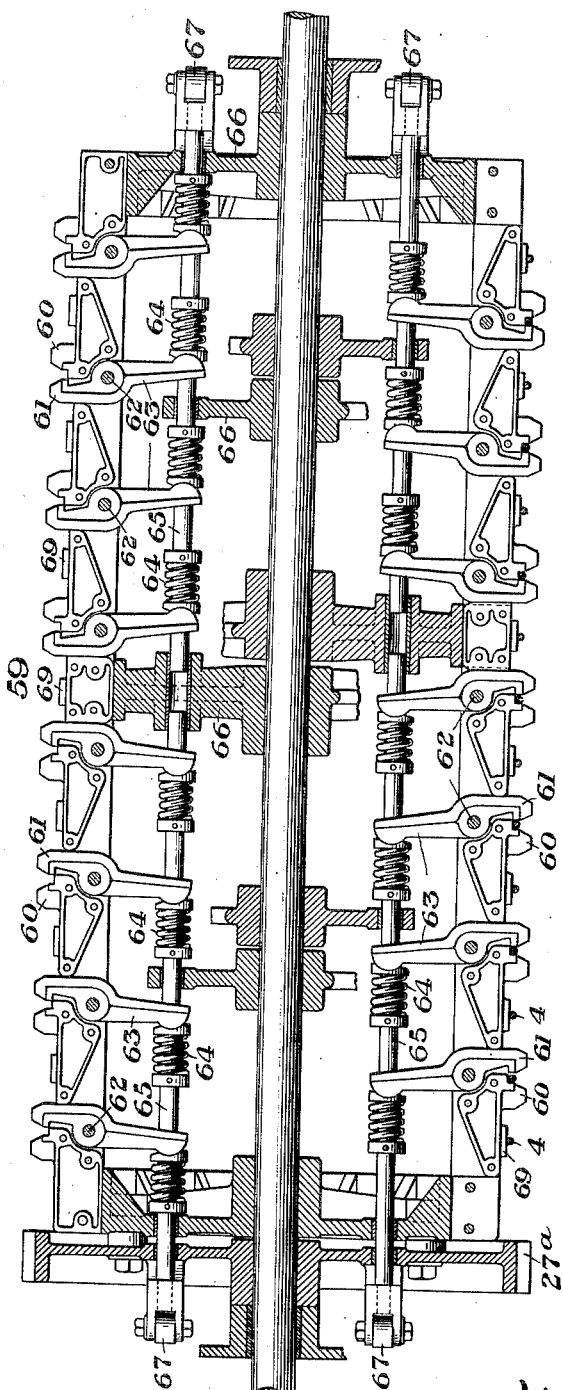

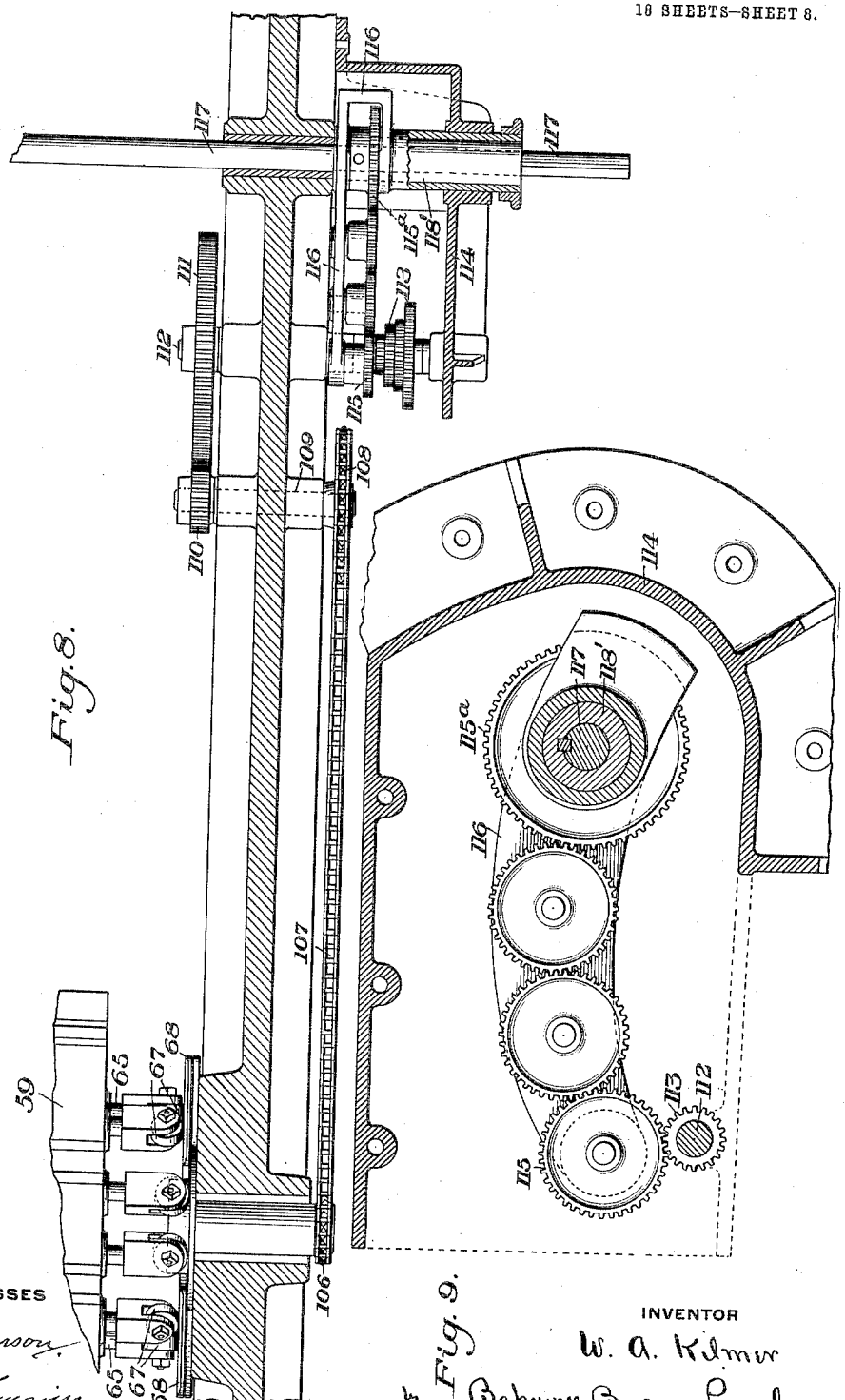

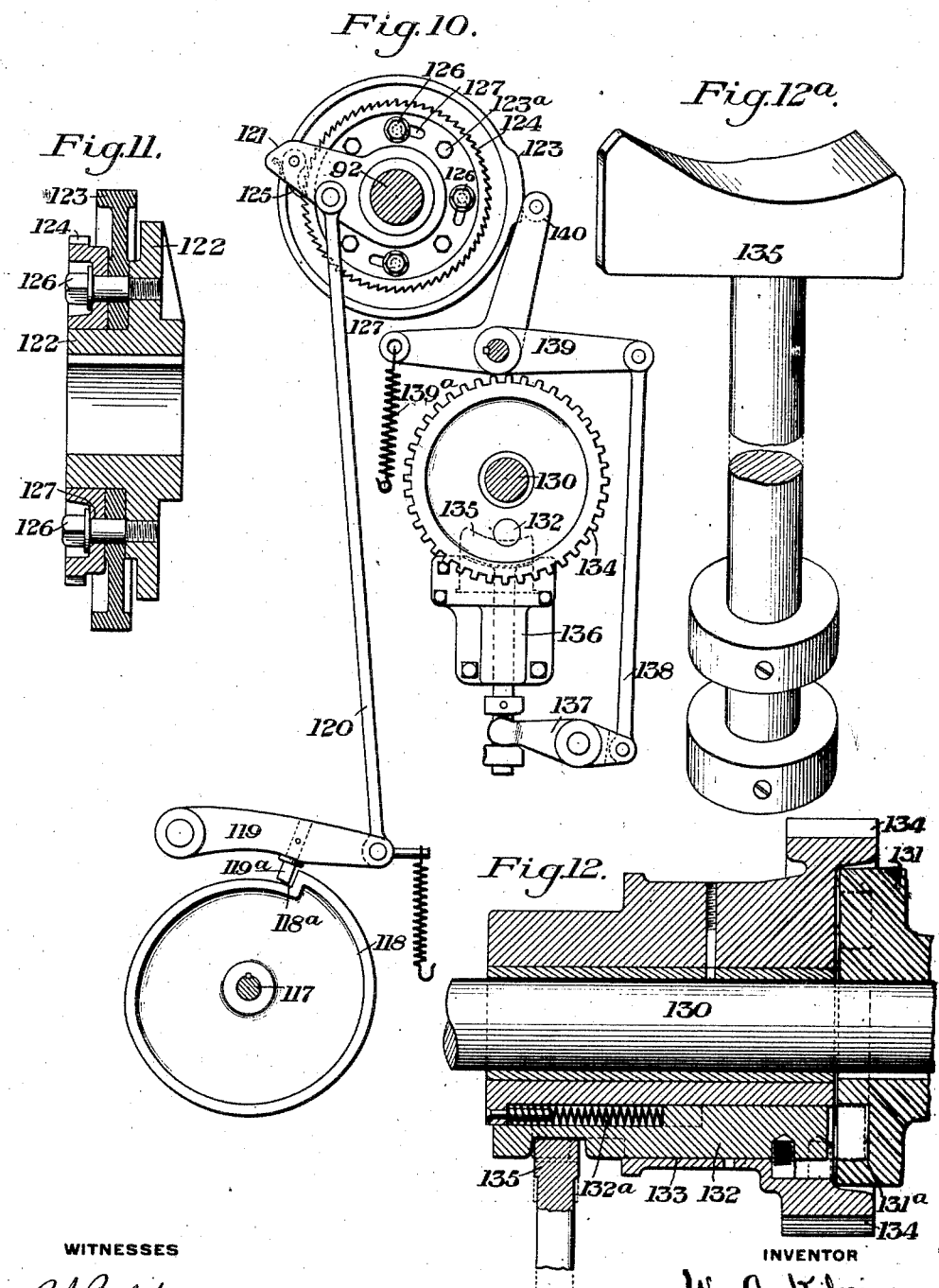

W. A. KILMER.
MACHINE FOR MAKING WIRE FABRIC.
APPLICATION FILED NOV. 29, 1909.

1,076,831.

Patented Oct. 28, 1913.
18 SHEETS—SHEET 10.

WITNESSES
R. A. Balderson
Walter Famaries

INVENTOR
W. A. Kilmer,
by Bakewell, Byrnes & Parmelee,
his Attys.

W. A. KILMER.
MACHINE FOR MAKING WIRE FABRIC.
APPLICATION FILED NOV. 29, 1909.
1,076,831.
Patented Oct. 28, 1913.
18 SHEETS—SHEET 11.
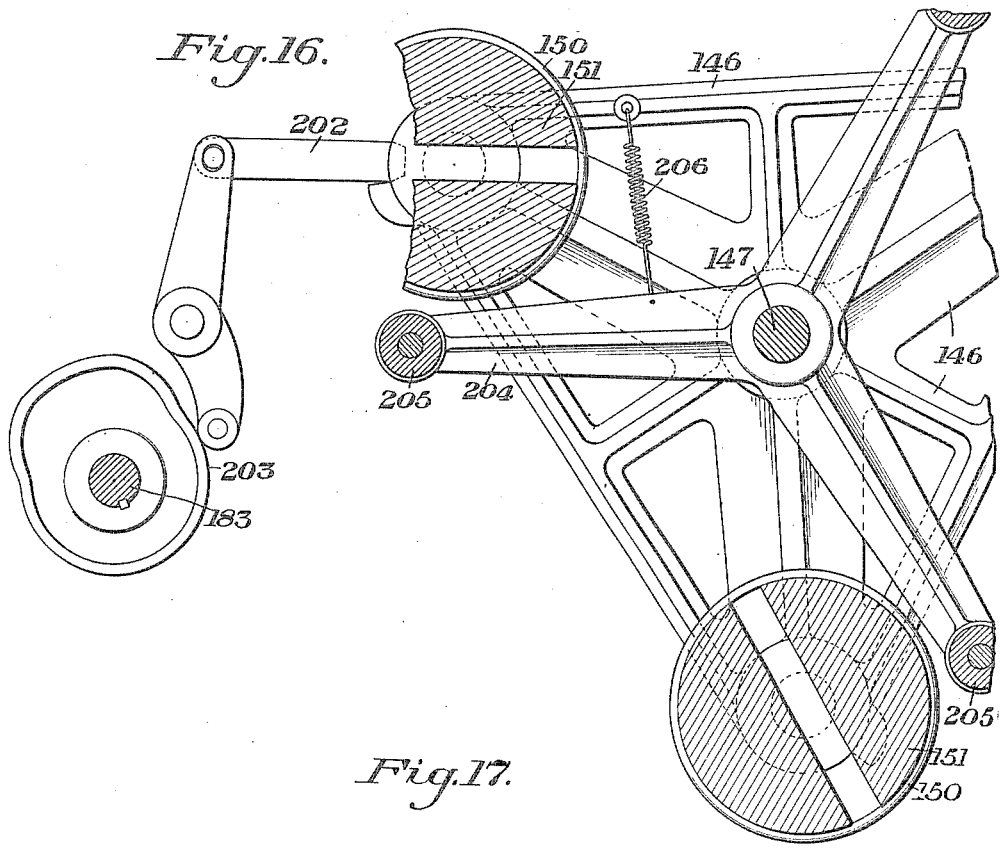
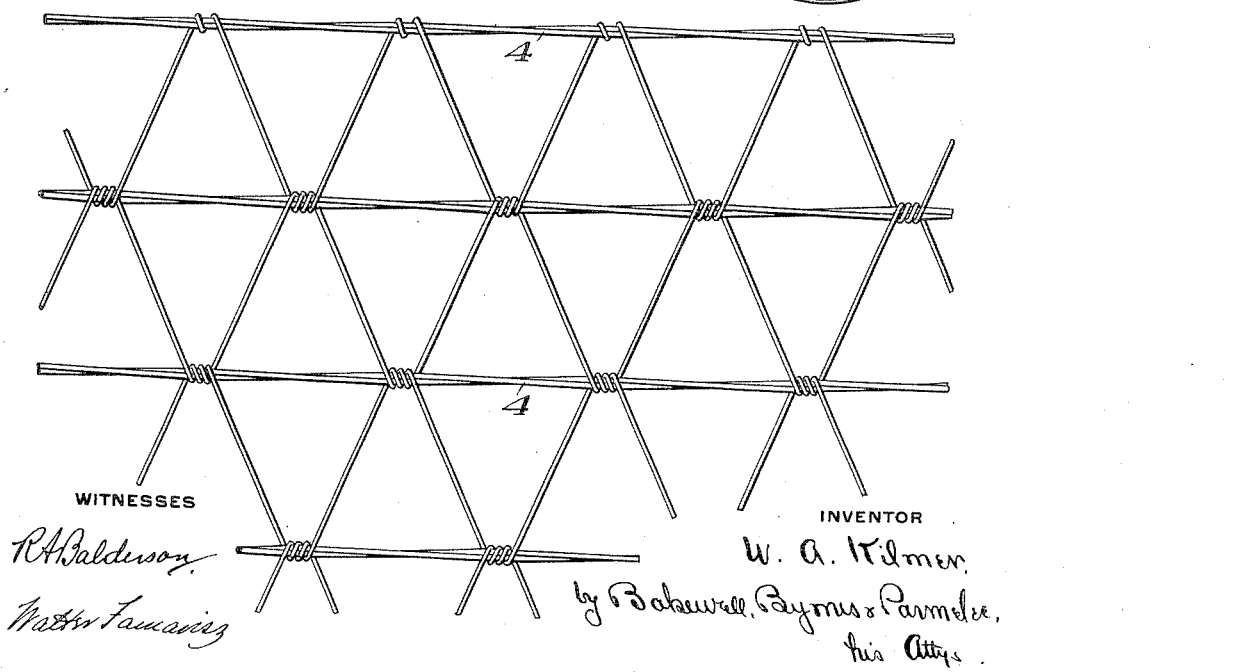
WITNESSES
INVENTOR
W. A. Kilmer
by Bakewell, Byrnes & Parmelee,
his Attys.

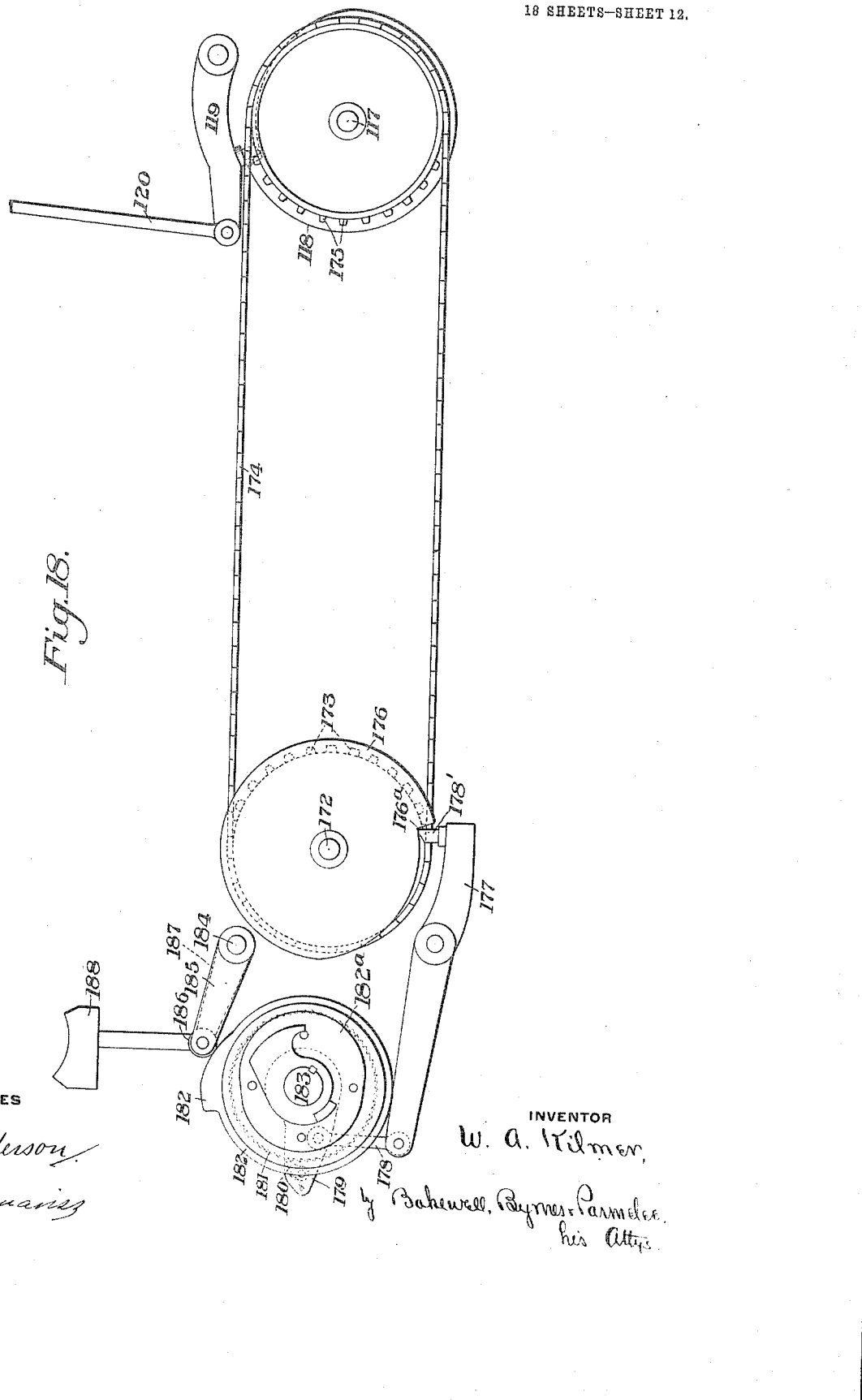

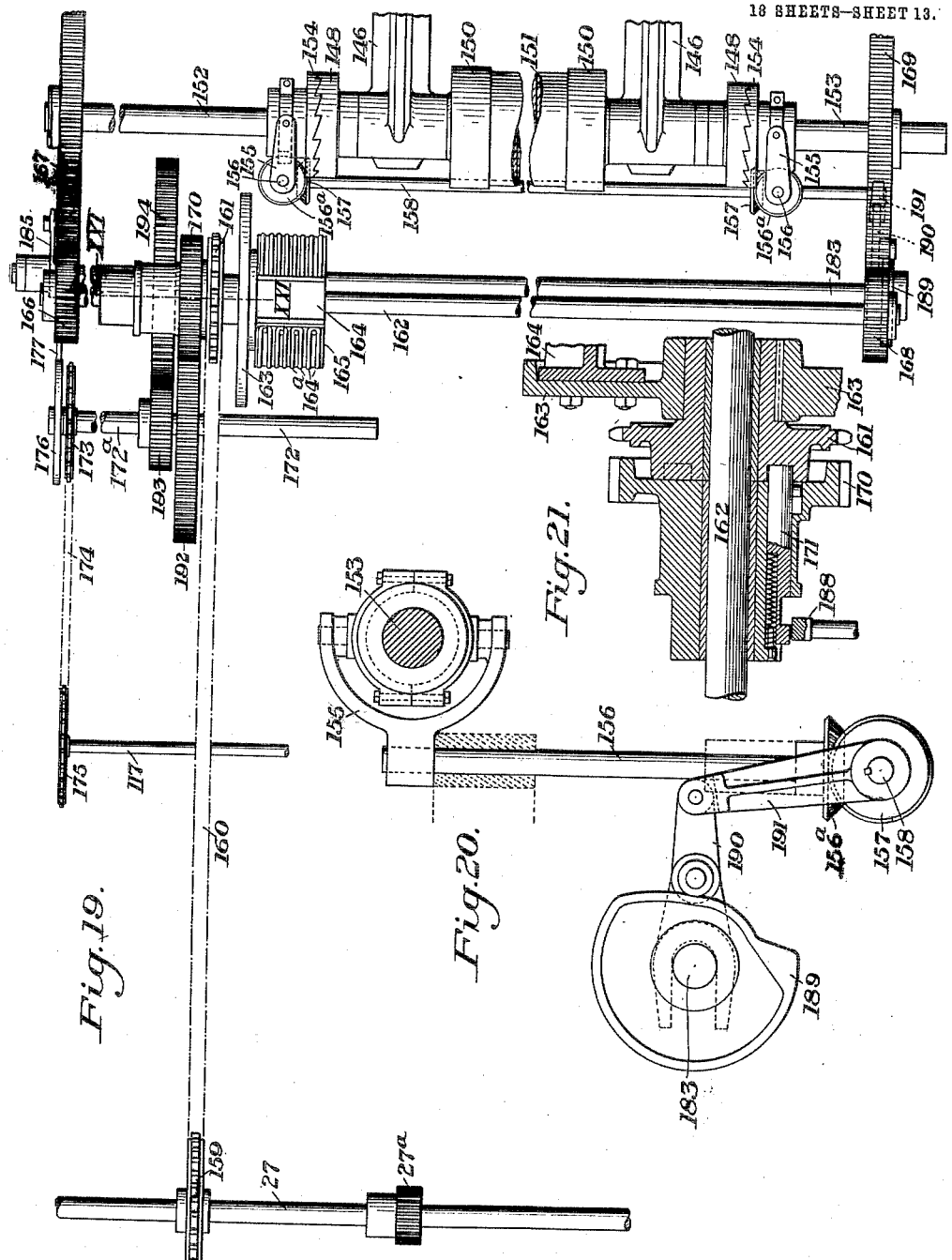

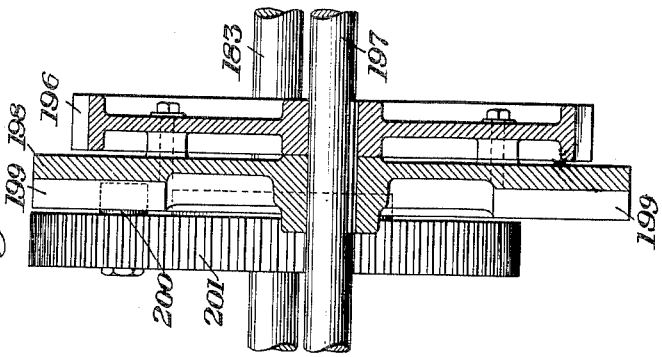
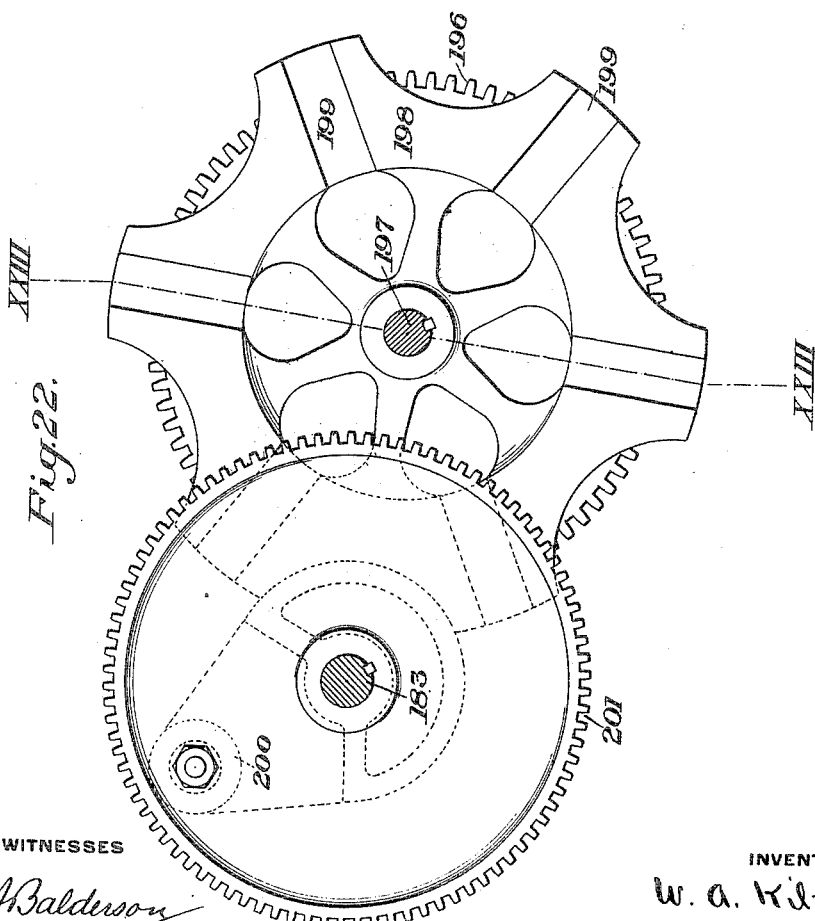

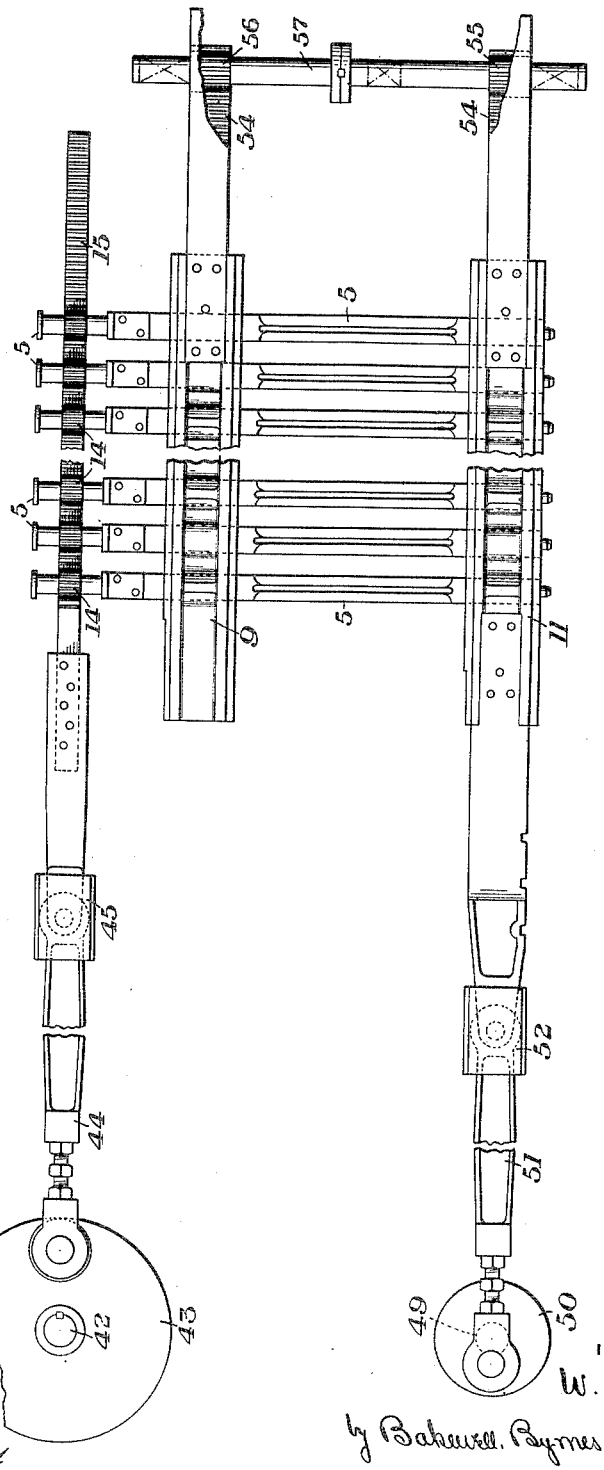

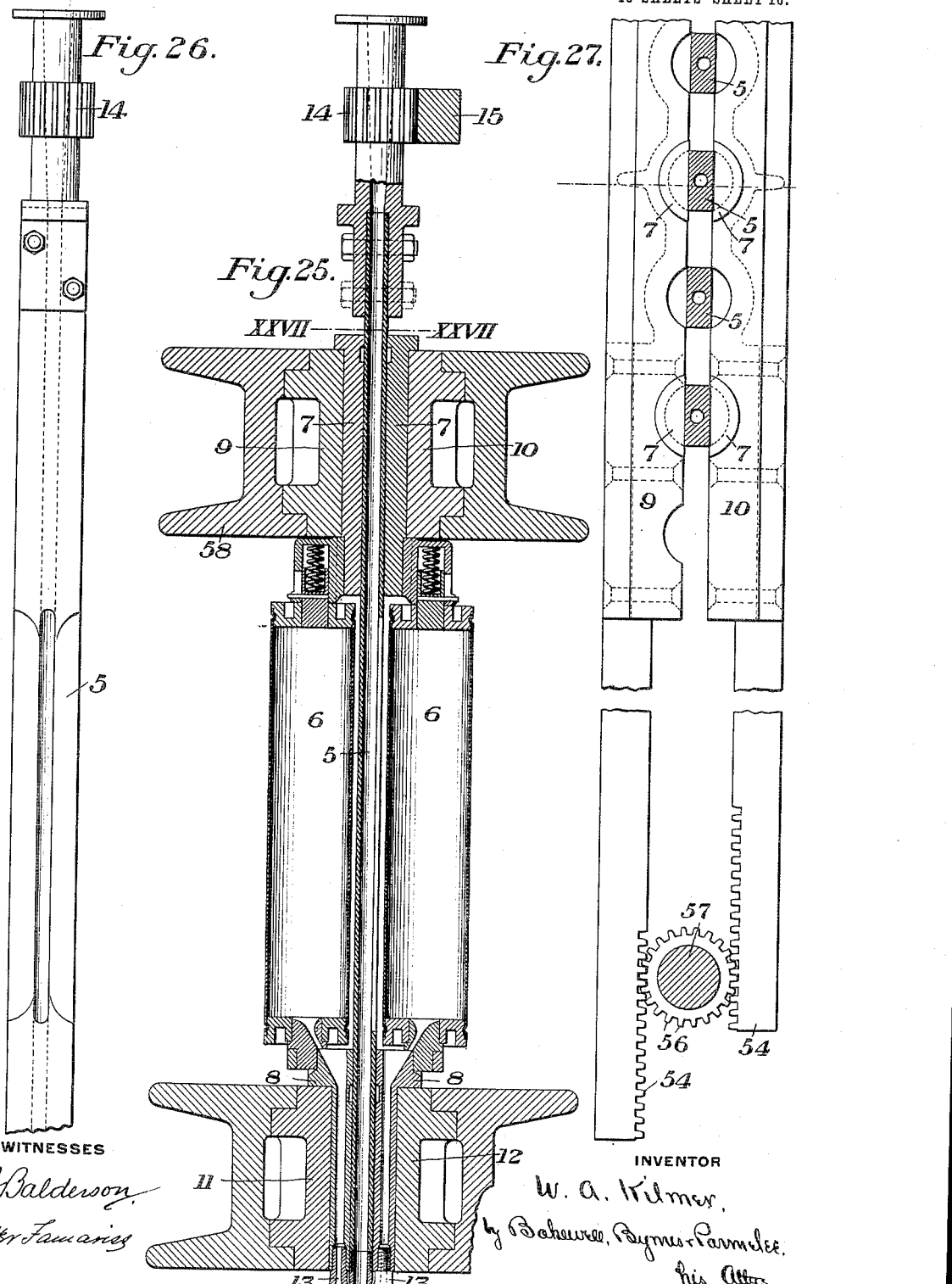

W. A. KILMER.
MACHINE FOR MAKING WIRE FABRIC.
APPLICATION FILED NOV. 29, 1909.
1,076,831.
Patented Oct. 28, 1913.
18 SHEETS—SHEET 17.
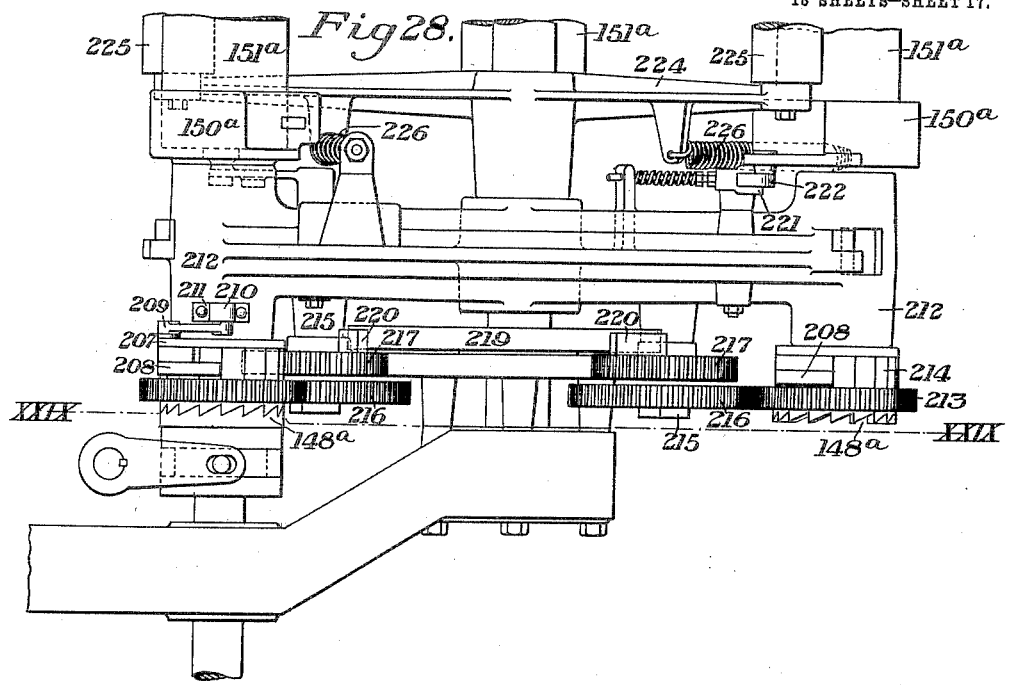
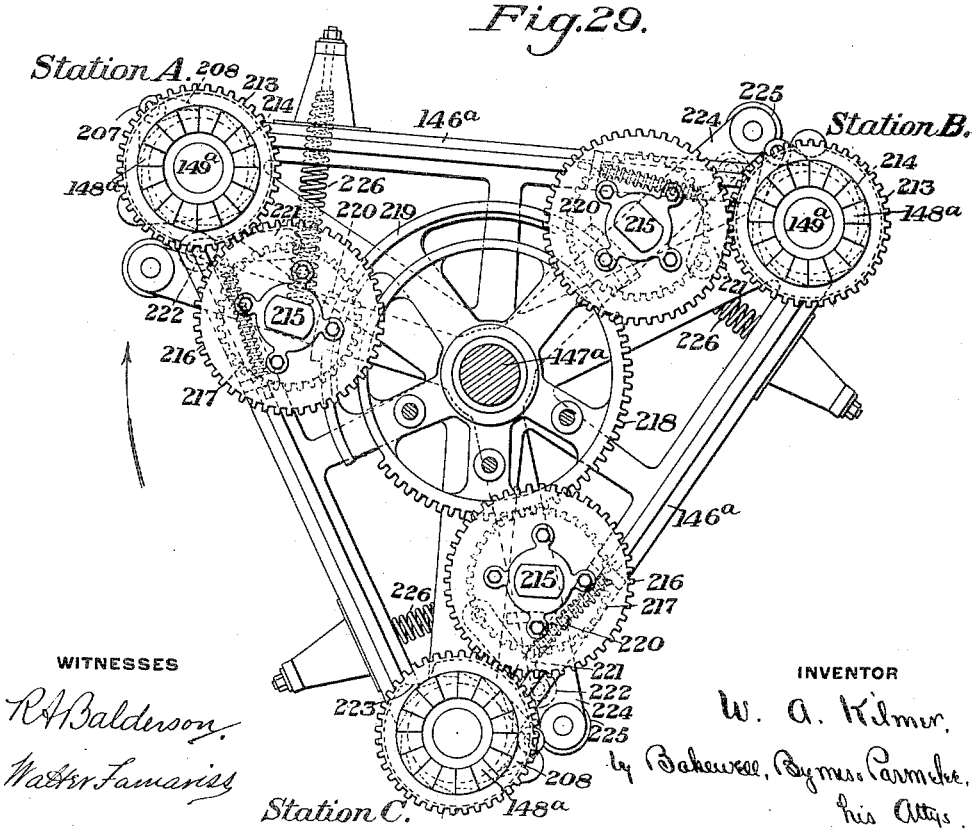
WITNESSES
R. A. Balderson
Walter Lamariss
INVENTOR
W. A. Kilmer
by Bakewell, Byrnes, Parmelee
his Attys.

W. A. KILMER.
MACHINE FOR MAKING WIRE FABRIC.
APPLICATION FILED NOV. 29, 1909.
1,076,831. Patented Oct. 28, 1913.
18 SHEETS—SHEET 18.
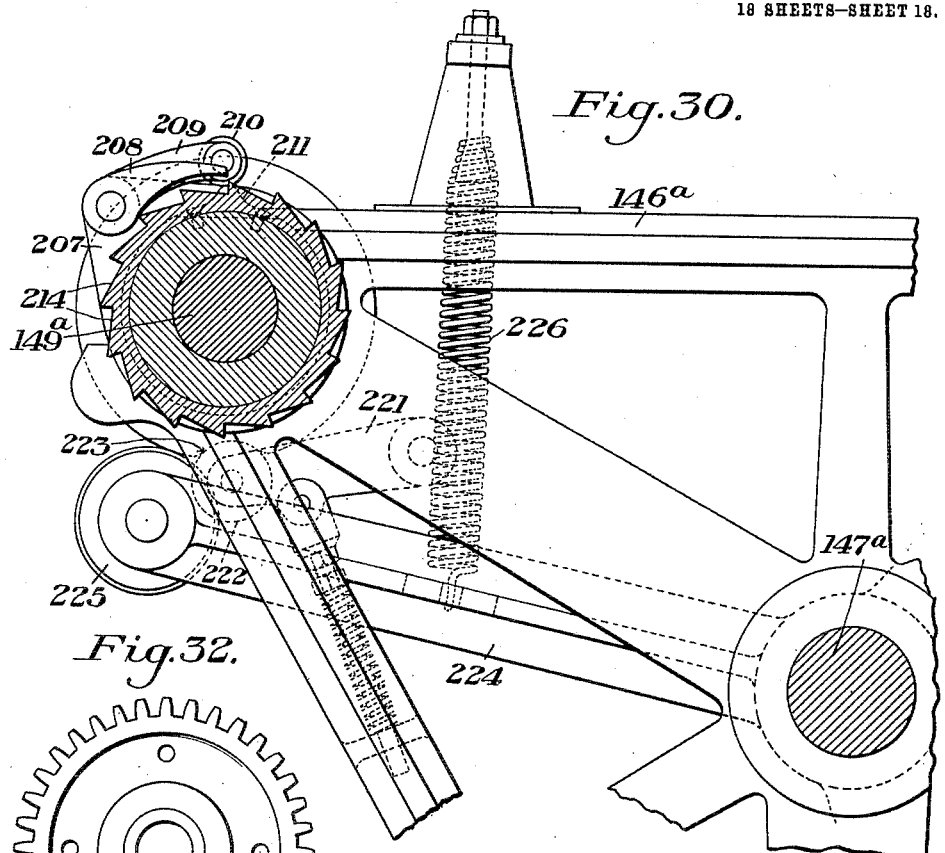
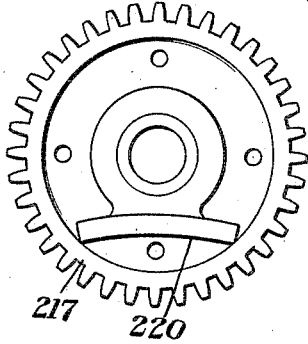
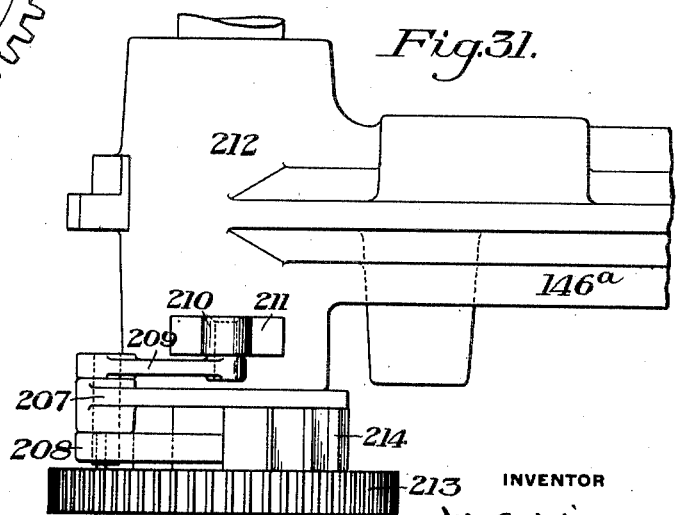
WITNESSES
INVENTOR

UNITED STATES PATENT OFFICE.

WILLIAM A. KILMER, OF DE KALB, ILLINOIS, ASSIGNOR TO THE AMERICAN STEEL AND WIRE COMPANY OF NEW JERSEY, OF HOBOKEN, NEW JERSEY, A CORPORATION OF NEW JERSEY.

MACHINE FOR MAKING WIRE FABRIC.

1,076,831.  Specification of Letters Patent.  Patented Oct. 28, 1913.

Application filed November 29, 1909. Serial No. 530,348.

*To all whom it may concern:*

Be it known that I, WILLIAM A. KILMER, of De Kalb, Dekalb county, Illinois, have invented a new and useful Machine for Making Wire Fabric, of which the following is a full, clear, and exact description, reference being had to the accompanying drawings, forming part of this specification, in which—

Figure 1:
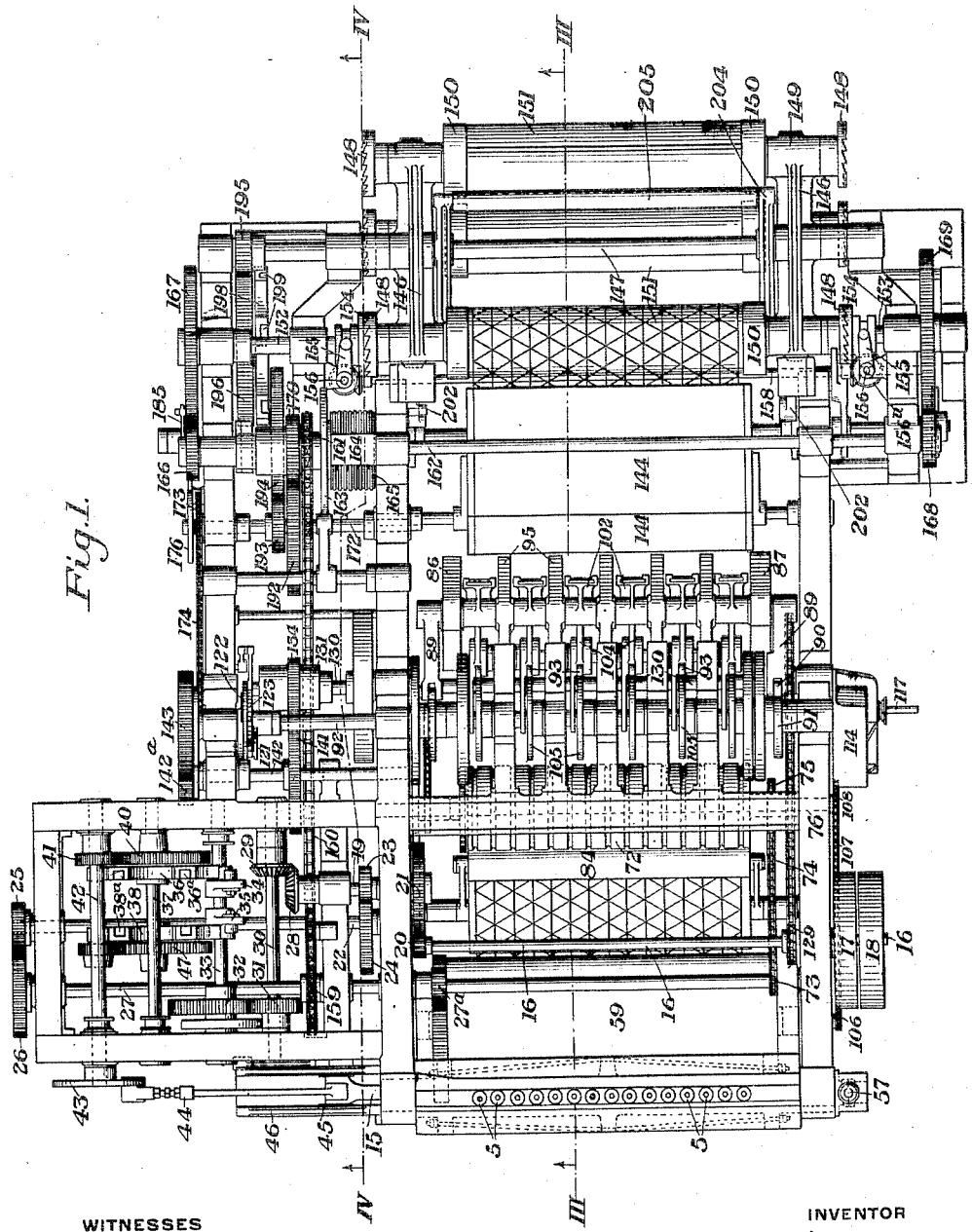
Figure 2:
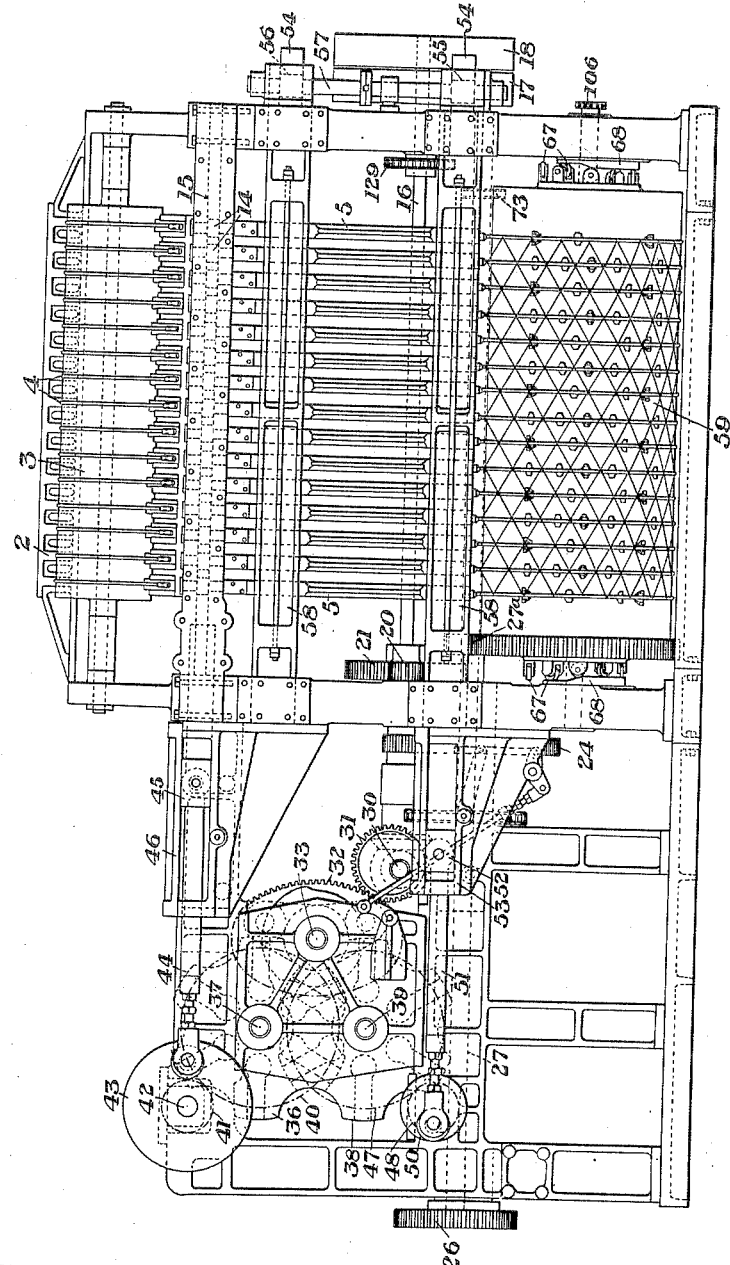
Figure 3:
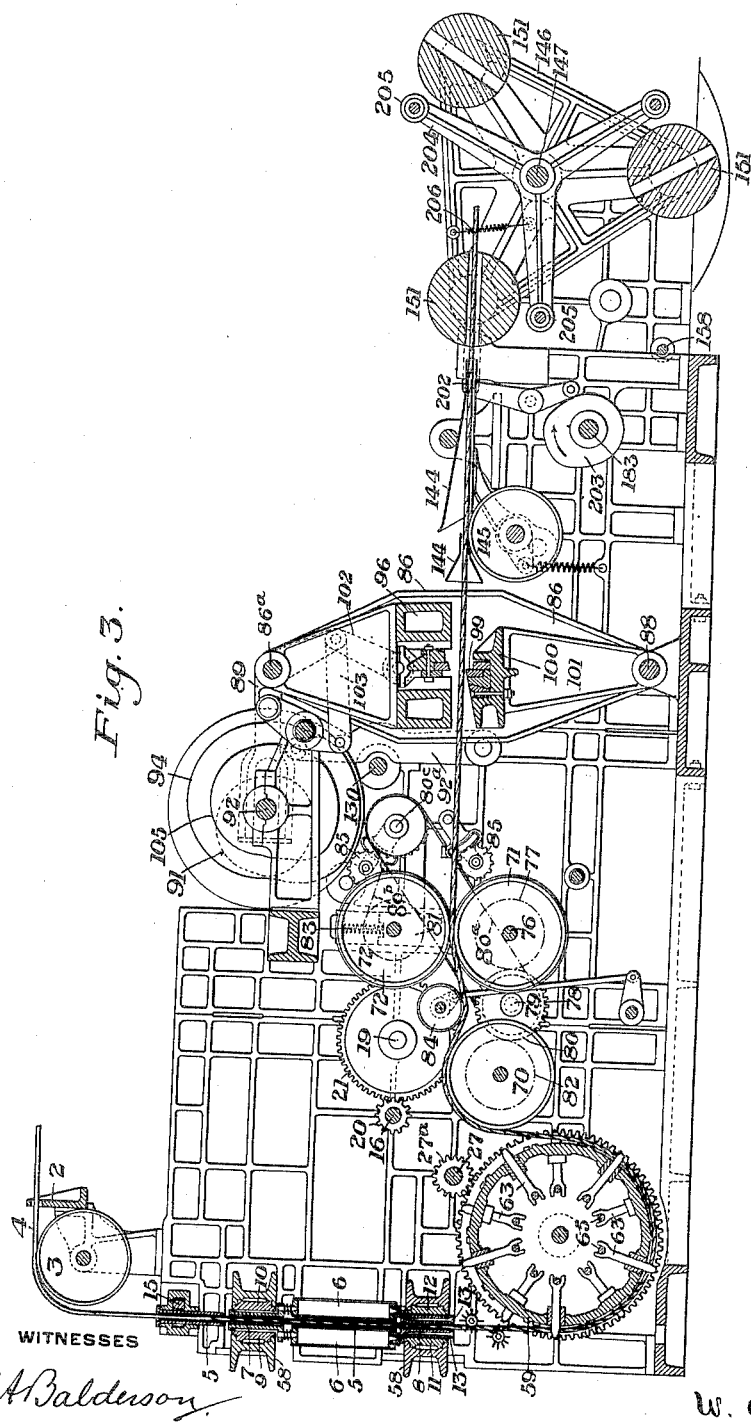
Figure 4:
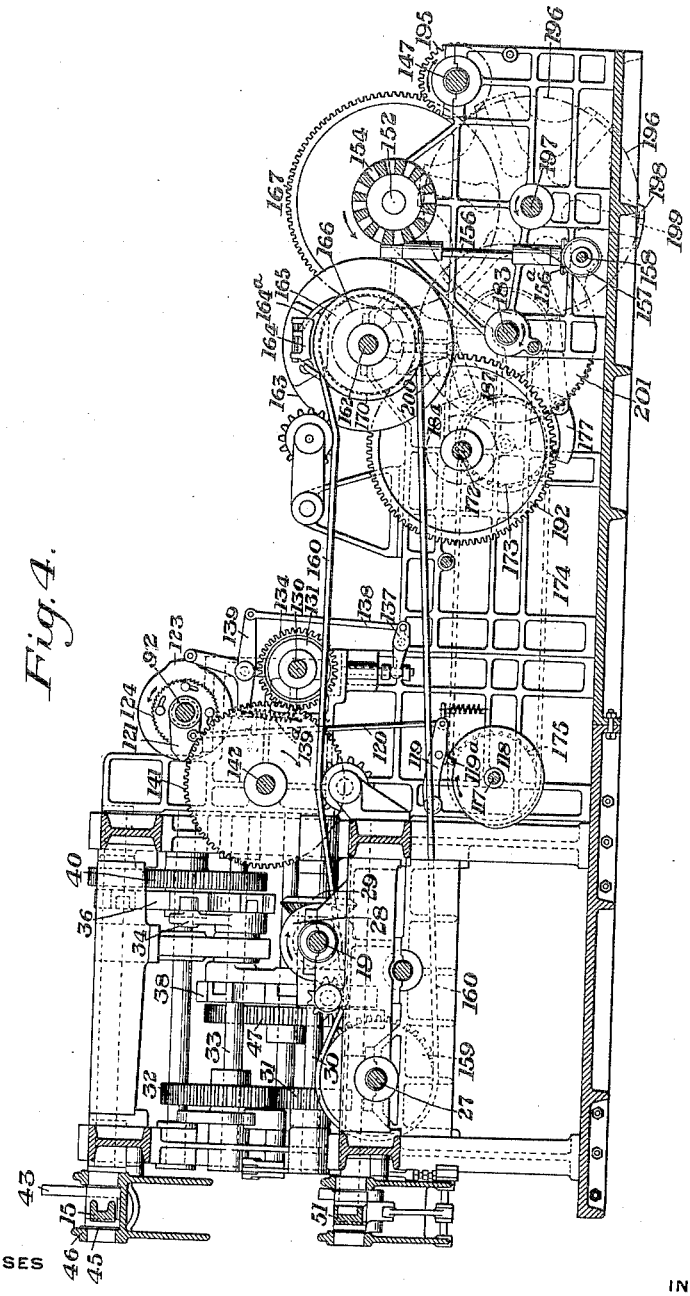
Figure 13:
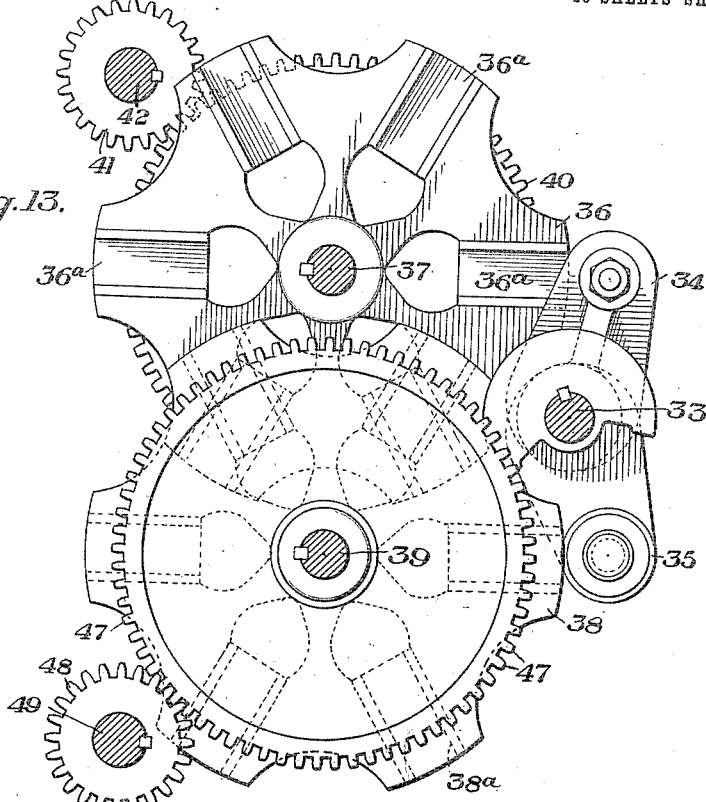
Figure 15:
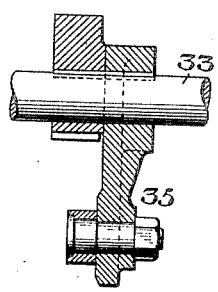
Figure 14:
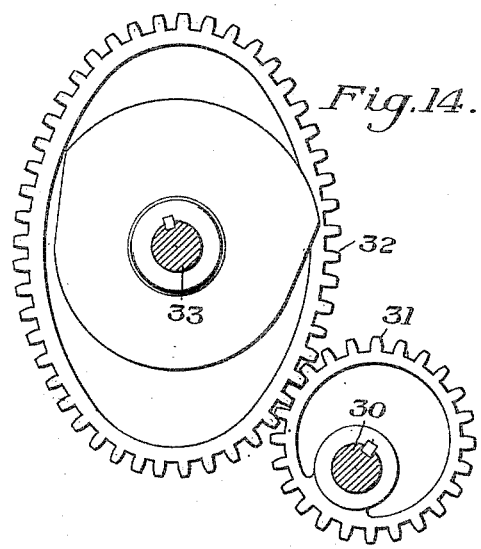

Figure 1 is a plan view of a machine embodying my invention with portions of the wire guiding mechanism removed; Fig. 2 is a front end elevation of the machine with the bobbins removed; Fig. 3 is a longitudinal section on the line III—III of Fig. 1; Fig. 4 is a longitudinal section on the line IV—IV of Fig. 1; Fig. 5 is a plan view showing a portion of the machine and gearing on a larger scale; Fig. 6 is a longitudinal vertical section of a portion of the machine showing the shearing mechanism; Fig. 7 is a longitudinal section of the pull-out drum, removed; Fig. 8 is a detail sectional view showing a portion of the pull-out drum and the change gearing for actuating the shear mechanism; Fig. 9 is a detail view of said gearing; Figs. 10, 11, 12 and 12ª are detail views showing portions of the shear-actuating mechanism as hereinafter more fully described; Figs. 13, 14 and 15 are detail views of portions of the gearing; Fig. 16 is a detail view showing the reel carrier and the latch for the same; Fig. 17 is a plan view of a fragment of fabric made by the machine; Fig. 18 is a side view from the opposite side of the machine showing a portion of the gearing which controls the operation of the clutches for the reel; Fig. 19 is a plan view of the gearing for actuating the reel and its clutches; Figs. 20 and 21 are detail views of a portion of such gearing, Fig. 21 being a section on the line XXI—XXI of Fig. 19; Figs. 22 and 23 are detail views of a portion of the gearing which actuates the reel carrier; Fig. 24 is a front view, partly broken away, showing the bobbin-actuating mechanism; Fig. 25 is a vertical section through one of the bobbin spindles and adjacent parts; Fig. 26 is an elevation, partly broken away, of one of the bobbin spindles; and Fig. 27 is a sectional plan view on the line XXVII—XXVII of Fig. 25; Fig. 28 is a plan showing the construction of a portion of the reel mechanism; Fig. 29 is a section on the line XXIX—XXIX of Fig. 28; and Figs. 30, 31 and 32 are detail views of parts of the reel mechanism, hereinafter more fully described.

My invention has relation to machines for making wire fabric, particularly wire fabric for use in reinforcing concrete, and consisting of longitudinal strands each of which may be composed of a single wire, or of a plurality of wires made parallel or twisted together, and diagonal or mesh wires alternately twisted around the strand wires in opposite directions.

My invention is designed to provide a machine for making fabric of this character, by means of which such fabric may be made rapidly and in large quantities; and which will automatically shear the fabric into any desired lengths while the fabric is in motion. The invention also comprises means of novel character for continuously reeling the sheared lengths of fabric, and mechanism whereby a completed coil or spool is automatically swung out of the way and an empty one is placed in position while the fabric is in motion, thus enabling the reel to be unloaded without stopping the machine.

Other features of my invention relate to the novel construction and arrangement of the pull-out drum; to the mechanism for actuating the bobbin carriers and bobbins; to the feed mechanism; to the shear mechanism and the means for actuating the same; and to various other details of construction, combination and arrangement of the parts, as more fully hereinafter described.

For convenience of description the machine may be divided into several main groups of mechanism, as follows:—First. The means for imparting motion to the twisting spindles and bobbins. Second. The pull-out mechanism. Third. The feed rolls and their actuating mechanism. Fourth. The shears and their actuating mechanism. Fifth. The reels and their actuating mechanisms. These several groups of mechanisms will now be specifically described.

*The bobbin actuating mechanism.*—The numeral 2 designates a series of guides, and 3 a series of guide rolls (Figs. 2 and 3) over which the series of longitudinal or strand wires 4 are pulled downwardly through the hollow twisting spindles 5 by the action of the pull-out drum, in the manner hereinafter described. 6 designates a series of bobbins which are mounted transversely of the machine in two rows at opposite sides of the spindles 5. These bobbins are mounted on the upper and lower bobbin segments 7 and 8, which are seated between reciprocating shifter bars. The upper shifting bars are designated by the numerals 9 and 10 and the lower shifting bars by the numerals 11 and 12. (Figs. 3, 24, 25 and 27.) The lower bobbin segments are provided with the delivery quills 13, through which the strand wires are led. The bobbin segments and bobbins are shifted back and forth to move the bobbins and thereby form the diagonal mesh of the fabric by the reciprocating movement of the shifting bars 9, 10, 11 and 12 in a manner presently to be described, and the spindles 5 are arranged to rotate the bobbin segments and bobbins at the proper times by means of pinions 14. One of these pinions is secured to each of the spindles 5, and is actuated by reciprocating rack bar 15.

The particular arrangement of the bobbins, shifting bars and twisting spindles form no part of my invention, this mechanism being similar to what has heretofore been used in the manufacture of the well known "Ellwood" fabric. My invention, however, comprises a certain novel arrangement of gearing and actuating devices for the shifting bars, and for the twisting spindles, which will now be described.

Referring to Fig. 1, 16 designates the main driving shaft of the machine, upon which is mounted the fast and loose driving pulleys 17 and 18. The motion of the main shaft 16 is transmitted to a second shaft 19 through the gears 20 and 21, and from the shaft 19 to a third shaft 22 through the gears 23 and 24. The shaft 22 is connected by change gears 25 and 26 with the shaft 27, which is connected by gears 27ª with the shaft of the pull-out drum 59. The shaft 19 also carries a bevel gear 28, which meshes with a similar gear 29 on a transverse shaft 30. Mounted on the shaft 30 is an eccentric pinion 31 (see Figs. 1, 2 and 14) which meshes with an elliptical gear 32 on a shaft 33. Fastened to this shaft 33 are two crank arms 34 and 35 (see Figs. 1 and 13). The crank arm 34 imparts motion to a star wheel 36 on a shaft 37; and the crank arm 35 imparts motion to another star wheel 38 on a shaft 39. Fastened to the star wheel 36 is a spur gear wheel 40, which meshes with a pinion 41 on a shaft 42. Secured to the shaft 42 is a crank disk 43 (see Fig. 2), to the crank pin of which is connected a pitman 44. The opposite end of this pitman is connected to a cross-head 45 sliding in guides 46, and this cross-head is in turn connected to the rack bar 15, which, as above described, engages the pinions on the hollow twisting spindles 5. (See Fig. 24.) When the roller at the end of the crank arm 34 reaches one of the recesses 36ª in the star wheel 36, it causes this wheel to turn one-sixth of a revolution, and through the gears 40 and 41 turns the crank disk 43 a one-half revolution, thereby causing the bobbins to revolve the desired number of times around the strand wires. Secured to the star wheel 38 is a gear wheel 47 (see Fig. 13) which meshes with a pinion 48 on a shaft 49. Secured to this shaft 49 is a crank disk 50 (see Fig. 2), which is connected by a pitman 51 with a cross-head 52 sliding in guides 53. This cross head is connected to the lower bobbin shifting bar 11. Each pair of bobbin shifting bars has a rack 54 on its inner surface, these racks engaging opposite sides of toothed pinions 55 and 56 on a vertical shaft 57 (see Figs. 1, 2, 24 and 27). The shifter bars are arranged to reciprocate in the upper and lower guides 58. After the bobbins have been given the required number of revolutions, as before described, the roller on the end of the crank arm 35 engages one of the recesses 38ª in star gear 38, and through the gears 47 and 48 and shaft 49, turns the crank disk 50 a one-half revolution, thereby causing two of the bobbin shifting slides to move forward, and the other two slides to move backward, carrying with them the bobbins so as to form the mesh. As soon as this has been done, the crank disk 43 is given another half turn in the same direction as before, causing the spindles 5 to revolve, but in the opposite direction. The crank disk 50 makes one-half turn for each revolution of the crank arm 35, and as this crank disk is turned always in one direction, it reverses the direction of slides for each revolution. The longitudinal spacing of the mesh wires is accomplished by regulating the speed of the pull-out drum by means of the change gears 25 and 26.

*The pull-out mechanism.*—59 designates the pull-out drum, which is driven through the gear connections with the main driving shaft 16 in the manner before described. This drum, as best shown in Figs. 3 and 7, is of cylinder form, and carries a plurality of series of grippers, which are arranged to grip each strand wire alternately and independently. These grippers are arranged in longitudinal radial lines equally spaced about the periphery of the drum, and consist each of a stationary jaw 60 and a movable jaw 61. Each movable jaw is pivoted to the drum at 62, and has an inwardly extending arm 63 which engages a spring 64 on an endwise movable shaft or rod 65. A series of these shafts 65 is provided within the drum and supported in suitable bearings 66 therein. Each shaft is divided at the center, as shown in Fig. 7, and the outer end of each shaft carries an anti-friction roller 67. These anti-friction rollers engage fixed cams 68, in the manner best shown in Fig. 8, and which cams are adapted to effect a sufficient endwise movement of the rods to open and close the grippers through the action of the springs 64. The grippers in each longitudinal series are arranged alternately of those in adjacent series, so that as the drum is rotated each line or series of grippers will engage every other strand wire, and the following line or series of grippers will engage alternate strand wires. The drum is also provided with the rests 69 between the grippers in each longitudinal line or series for supporting the strand wires which are not engaged by the grippers of that series. By means of the springs 64 the grippers are caused to exert a uniform pressure on each strand wire, and will adjust themselves automatically to different sized wires. The rotation of this drum causes the strand wires to be pulled through the guides to and downwardly through the coiling spindles.

*The feed rolls and their actuating mechanism.*—The fabric passes down and underneath the pull-out drum 59 in the manner best shown in Fig. 3, and thence upwardly over the feed rolls 70 and 71 and between the feed rolls 71 and 72, and thence forwardly to the action of the shears. At one end of the shaft 27 is secured a sprocket wheel 73, which drives a chain 74 passing over a sprocket wheel 75 on the end of the shaft 76 of the lower feed roll 71. (See Figs. 1 and 3.) The shaft 76 also carries a gear wheel 77, which meshes with a gear wheel 78 on a shaft 79 intermediate of the two lower feed roll shafts. Fastened to the gear 78 is a sprocket wheel 80, which, by means of the chains 80ª, 80ᵇ and sprocket wheels on the idler countershaft 80ᶜ drives the sprocket wheel 81 on the shaft of the upper feed roll 72. The gear wheel 78 also drives a gear wheel 82 on the shaft of the lower feed roll 70. The upper feed roll 72 is preferably spring-mounted as indicated at 83 in Fig. 3, so that its tension on the fabric may be adjusted. 84 designates an adjustable pressure roll for the fabric. 85 designates idler sprockets for adjusting the tension of the feed roller drive chains 80ª, 80ᵇ.

*The shears and their actuating mechanism.*—The machine is designed to automatically shear the fabric into desired lengths without stopping the operation of the machine, and for this purpose a flying shear mechanism, arranged to move forwardly with the fabric and at the same rate of speed, is provided. This mechanism will now be described:—86 and 87 designate shear rocker arms (see Figs. 1, 3 and 6), one at each end of the shears, and which are pivoted at their lower ends at the base of the machine at 88. The upper ends of the two rockers 86 and 87 are connected by a transverse shaft 86ª, and connected to each end of this shaft is a cam lever 89. Each of these levers has an anti-friction roller 90 on one end, which works against the face of a cam 91 on the transverse shaft 92. 92ª is a rocking lever which supports one of the cam levers 89, and the other cam lever 89 has a similar supporting lever. As the shaft 92 is rotated, these cams vibrate the rocker arms 86 and 87 to cause them to move forwardly with the fabric to make a shear in the manner hereinafter described, and then to be withdrawn backwardly to their normal positions. The shaft 86ª also carries a plurality of depending intermediate guide brackets 95, which form a support for the transverse guides 96, between which an upper shear carrier 97 is arranged to vertically reciprocate. 98 is a transverse shear blade secured in the upper shear carrier. 99 is the lower and relatively fixed shear blade, which is seated in a carrier 100 supported by arms or brackets 101 carried by the lower pivot shaft 88 of the main rocker arms 86 and 87. Connected to the upper transverse shaft 86ª and to the upper shear carrier, is a series of toggles 102. Each of these toggles is connected at the joint by a link 103 to a rocker arm 104 and the upper ends of the rocker arms 104 are provided with links 93ª having an antifriction roller 93 on one end which projects into the recesses of the cam 105, which is in engagement with a cam 105 on the shaft 92, (see Fig. 6), a series of these cams being arranged on said shaft intermediate the cams which actuate the main rocker arms 86 and 87. As the main rocker arms 86 and 87 move forward, the rocker arms 104 are held stationary by their cams, thereby causing the toggles 102 to force the upper shear carrier downwardly into shearing relation to the lower shear blade 99, thus shearing the fabric. As soon as this is done, and while the rocker arms 86 and 87 are still moving forward, the rocker arms 104 are moved by means of the cams 105 to cause the toggle arms to open and raise the upper sliding shear to its normal position and hold it there during the return motion of the shear rockers 86 and 87.

The shear mechanism is capable of adjustment so as to vary the lengths of fabric which will be sheared, and the mechanism for accomplishing this, together with the mechanism for actuating and timing the parts is as follows:—On the end of the shaft of the pull-out drum 59 is secured a sprocket wheel 106, which drives a chain 107, and this chain in turn drives a sprocket wheel 108 on a stub-shaft 109 (see Figs. 1 and 8). The shaft 109 carries a pinion 110, meshing with a gear wheel 111 on a shaft 112, which carries a series of change gears 113 contained within a box or casing 114. Any one of the change gears 113, which are of different diameters, is designed to be brought into mesh with one of a series of intermeshing gears 115, which are journaled in a frame or bracket 116 mounted to slide endwise on the transverse shaft 117, the end gear 115ª of the series of gears 115 being arranged to drive said shaft through the medium of a sleeve 118′, splined thereto, and movable endwise thereon with the frame or bracket 116. In this manner, the train of gears 115 may be brought into line and engage with any one of the change gears 113, and thereby vary the speed of the shaft 117. The shaft 117 has secured thereto a cam 118 (see Figs. 4 and 10). Directly over this cam 118 is a pivot lever 119, which is connected by means of a rod 120 to a pawl arm 121 loosely fitted on a transverse shaft 92. Fastened to this shaft is disk 122. Cam 123 and ratchet 124 are fastened together by means of bolts 123ª and are secured to disk 122 by means of bolts 126, which pass through elongated slots 127 in cam 123 and ratchet 124, allowing the ratchet and cam to be turned about disk 122 in order to turn the high point of cam 123 away from roller 140 on lever 139. The main shaft 16 drives a sprocket chain 129, which in turn drives a shaft 130. On this shaft 130 (see Figs. 4, 10 and 12), is fastened a hub or disk member 131, which is provided with a recess 131ª to receive a sliding clutch pin 132, which is seated in a recess 133 of the hub of a gear wheel 134 loosely mounted on the shaft 130. 135 is a cam-shaped wedge member (see Fig. 12ª), which is arranged to slide vertically in a guide or bearing 136, and is adapted to move into engagement with said pin 132. Connected to the shank of said wedge is a pivoted lever 137, which is connected by a link 138 to a three-armed lever 139, one of the arms of said lever having a roller 140 at its upper end which rolls on the surface of the cam disk 123. When the recess 118ª of the cam disk 118 reaches the knife blade or projection 119ª of the lever 119, the arm 119 drops and thereby pulls the rod 120 downwardly. This turns the ratchet 124 and with it cam 123 by means of slotted holes 127 about disk 122, which causes roller 140 on lever 139 to roll off of high point on cam 123 which actuates the lever 139 by means of spring 139ª, to pull the cam wedge 135 down and out of the path of the clutch pin 132. A spring 132ª (see Fig. 12) then acts upon said pin to cause it to enter the recess 131ª in the hub or disk member 131. The gear wheel 134 meshes with a gear wheel 141 (see Fig. 1) on a shaft 142; and this shaft 142 is geared to the cam-carrying shaft 92 through the change gears 142ª and 143. The shaft 92 operates the shears in the manner before described. A little before the shear rockers 86 and 87 have returned to their normal position after each operation, the high point of the cam 123 has thrown the lever 139 outwardly, thereby causing the wedge 135 to be again moved in the path of the clutch pin 132 and forcing said pin out of engagement with the recess of the disk 131. This causes the shaft 92 to cease rotation until the said clutch pin 132 is again thrown into engagement with the said disk. The speed of the shear is regulated by means of the change gears 142ª and 143. The parts are so proportioned that the shear travels forwardly at the same speed as the fabric, while cutting.

*The reels and their actuating mechanisms.*—After the fabric has been sheared, it passes forwardly through the guides 144 and over the guide drum or roller 145 to a reel, upon which it is wound. In accordance with my invention, means are provided whereby each reel, when it is loaded, is swung out of the way and an empty reel is placed in position while the fabric is in motion. I will now describe the means by which this is accomplished: 146 designates reel carriers, which are secured on a shaft 147, and which are provided with three sets of clutch members 148. These clutch members are secured to short shafts 149 (see Fig. 1), which shafts also carry sockets 150 for the reception of the reel drums 151. These sockets are equally spaced so that the centers of the reel drums will be 120 degrees apart, each drum being held in a socket at each end. The reel drums 151 are of the usual slotted or two-part form, as shown in Figs. 3 and 16. The carriers 146 are rotated to successively bring the drums into reeling position in a manner which will be hereinafter described. Each drum is successively brought into position with its axis in transverse alinement with the axis of the driving shafts 152 and 153. Secured to each of these shafts 152 and 153 is a clutch member 154, which is arranged to engage one of the clutch members 148 of the reel carriers. The clutch members 154 are longitudinally movable into and out of engagement with the clutches 148, and are actuated by the shifting arms 155 carried by vertical shafts 156 (see Figs. 1 and 19). On each shaft 156 is a bevel gear wheel 156ª which meshes with a corresponding bevel gear wheel 157 on a transverse shaft 158. When the shaft is actuated, both vertical shafts 156 are thereby rotated to shift the clutch members into and out of engagement with the clutch members 148.

The actuating mechanism for the shafts 152 and 153 and for the shaft 158 will now be described. These mechanisms are shown generally in Fig. 1, and are shown in detail in Figs. 19 and 20. On the shaft 27 is a sprocket wheel 159, which drives a sprocket chain 160, and this chain in turn drives a manner as in the form first described. As the direction of the movement of the reeling device is away from the ratchet teeth 214, on the gear 213, said reel is free to turn without interfering with the gear wheel 213. Through station C the gear 213 is turned a little over one complete revolution, so that the roller 210 will always reach the high point on the cam 211, thus insuring the correct placing of the reel no matter in what position it may be left by the operator at station B.

From the foregoing description, it will be understood that the fabric is continuously formed by the mechanism described; that this fabric is carried forwardly through the shears and is automatically sheared into lengths; that means are provided for varying the length of the sheared pieces; and that the sheared lengths are wound up on the reels, and that each reel as it becomes loaded is automatically moved out of the way and a new reel brought into receiving position. These operations take place automatically and without checking the operations of forming the fabric and moving it continuously forward.

It will be understood that various changes can be made in the details of construction and arrangement of the several mechanisms without departing from the spirit and scope of my invention as defined in the appended claims. Thus, the machine frame may be of any suitable character; the various gearings may be widely changed; changes can be made in the timing mechanisms and in various other minor features.

What I claim is:—

1. In a wire fabric machine, the combination of a plurality of twister spindles, a reciprocating rack bar for actuating said spindles, a crank element for operating the rack bar, and a star gear for actuating the crank element; substantially as described.

2. In a wire fabric machine, the combination of a plurality of twister spindles, a reciprocating rack bar for actuating said spindles, a crank element for operating the rack bar, a star gear for actuating the crank element, a crank for actuating the star gear, and elliptical gearing for actuating the crank; substantially as described.

3. In a wire fabric machine, the combination of a reciprocating bobbin shifting bar, a crank member connected to operate said bar, and a star gear for operating the crank member; substantially as described.

4. In a wire fabric machine, the combination of reciprocating bobbin shifting bars, a crank member connected to operate said bars, a star gear for operating the crank member, a crank for operating the star gear, and elliptical gearing for operating the crank; substantially as described.

5. In a wire fabric machine, the combination with bobbin shifting and rotating means, of crank elements for operating such means, star gears for operating the crank elements, and a crank shaft having cranks for actuating the star gears; substantially as described.

6. In a wire fabric machine, the combination with bobbin shifting and rotating means, of crank elements for operating such means, star gears for operating the crank elements, a crank shaft having cranks for actuating the star gears, and elliptical gearing for actuating the crank shaft; substantially as described.

7. In a wire fabric machine, the combination with fabric forming mechanism, of a pull-out drum having a plurality of grippers arranged in different longitudinal series, the grippers of adjacent series being arranged to operatively engage the alternate strand wires of the fabric; substantially as described.

8. In a wire fabric machine, the combination with means for forming the fabric, of a pull-out drum having a plurality of sets of grippers for gripping the strand wires of the fabric, the grippers being operated by sets and each of said grippers having an independently-movable spring-actuated jaw; substantially as described.

9. In a wire fabric machine, the combination with fabric-forming mechanism, of a pull-out drum having a plurality of rows or sets of gripping devices arranged in different longitudinal rows or series, the grippers of adjacent rows or series being in staggered relation, means for rotating the drum, and means for periodically closing and releasing the grippers; substantially as described.

10. In a wire fabric machine, a pull-out drum having a plurality of sets of grippers, the grippers in each set having an independently movable jaw and endwise actuating members for the grippers, means for actuating said members, and springs interposed between the members and the movable jaws of the grippers whereby the grippers of each set are yieldingly held in gripping position; substantially as described.

11. In a wire fabric machine, the combination with fabric-forming mechanism, of a rotary pull-out drum having a plurality of grippers arranged in longitudinal rows or series, each of said grippers having a movable jaw, a plurality of endwise movable members for actuating the movable jaws, and cam means for actuating said members, the grippers in one row or series operatively engaging with alternate strand wires on the pull out drum; substantially as described.

12. In a wire fabric machine, the combination with fabric forming mechanism, of a pull-out drum having a plurality of independently operated sets of strand wire grippers, the grippers in each set having a movable jaw, a spring arranged to act on each of the movable jaws, and means for successively compressing and releasing the springs of each set of grippers; substantially as described.

13. In a wire fabric machine, the combination with fabric-forming mechanism, of a pull-out drum having a plurality of grippers arranged in longitudinal rows or series, the grippers of adjacent rows or series being in staggered relation, and the drum having rests or supports intermediate of said grippers; substantially as described.

14. In a wire fabric machine, a pull-out drum having a plurality of sets of strand wire gripping devices, the grippers of each of said devices having an independently movable jaw arranged to automatically adjust itself to different sizes of strand wires, and means for actuating the jaws successively by sets; substantially as described.

15. In a wire fabric machine, a pull-out drum having a plurality of sets of grippers, the grippers in one set operatively engaging with strand wires not engaged by the grippers in another set, and means for actuating said sets of grippers by sets from the ends of the drums; substantially as described.

16. In a wire fabric machine, the combination with fabric-forming and feeding mechanisms, of a shear device for shearing the fabric into lengths and mechanism connecting the feeding mechanism and shear device for actuating said shear to cut the sheared fabric into measured lengths; substantially as described.

17. In a wire fabric machine, the combination with fabric-forming and feeding mechanisms, of a shear for shearing the fabric into lengths, and means connected to the fabric forming and feeding mechanisms for automatically operating the shear at predetermined intervals; substantially as described.

18. In a wire fabric machine, the combination with fabric-forming and feeding mechanisms, of a shear for shearing the fabric into lengths, and means connected to the fabric forming and feeding mechanisms for automatically operating the shear at predetermined intervals, said means being relatively adjustable to vary the relative movement of the shear and fabric forming mechanism; substantially as described.

19. In a wire fabric machine, the combination with fabric forming and feeding mechanisms, of a shear arranged to travel forwardly with and cut the moving fabric, and means for actuating the fabric forming and feeding mechanisms, said means being arranged to periodically actuate the shear; substantially as described.

20. In a wire fabric machine, the combination with fabric forming and feeding mechanisms, of a rocking shear, and intermittently actuating mechanism for periodically causing said shear to move forward with the fabric and cut the same, and then return to its original position; substantially as described.

21. In a wire fabric machine, the combination with fabric-forming and feeding mechanisms, of a rocking shear frame, a relatively fixed shear blade carried thereby, a movable shear blade also carried thereby, means for periodically moving said frame forwardly with the fabric, and means for periodically actuating the movable shear blade during the forward movements of the frame; substantially as described.

22. In a wire fabric machine, the combination of fabric-forming and feeding mechanisms, of a rocking shear device, means for actuating said device, and timing means for regulating the cutting movement of said shearing device; substantially as described.

23. In a wire fabric machine, the combination with a fabric forming mechanism and means for actuating said mechanism, of a reeling device, said reeling device having a plurality of reels successively movable into and out of rolling position relative to the fabric forming mechanism, and means operatively connected to driving means for the fabric forming mechanism for moving said reels into reeling position; substantially as described.

24. In a wire fabric machine, the combination with a fabric forming mechanism and means for actuating said mechanism, of a reeling device having a plurality of reels, mechanism for successively rotating each reel to wind the fabric thereon, means for moving the reels successively into reeling position, and means for mechanically attaching the reel rotating mechanism successively to the reels when moved into reeling position; substantially as described.

25. In a wire fabric machine, a reel for the woven fabric, comprising a carrier adapted to support a plurality of reels, and gearing for periodically actuating said carrier by a step by step movement, together with timing means for controlling the operation of the gearing; substantially as described.

26. In a wire fabric machine, the combination of a rotary reel carrier having means for supporting a plurality of reeling drums, gearing for actuating the carrier to bring the drums successively into and out of reeling positions, actuating gearing for the reels when in reeling position, and means for connecting said gearing to the operative reel without stopping the operation of any part of the machine; substantially as described.

27. In a wire fabric machine, a rotary reel carrier having means for supporting a plurality of reeling drums, means for rotating said carrier by a step by step movement, and latch means for holding the carrier in the desired positions; substantially as described.

28. In a wire fabric machine, a reeling device comprising at least two reels, means for moving the reels successively into and out of reeling position, gearing for actuating the reels when in reeling positions, and a clamping device for holding the fabric from unwinding from the reels; substantially as described.

29. In a wire fabric machine, a reeling device comprising at least two reels, and mechanism operatively connected to said fabric machine arranged to move said reels successively into and out of reeling position, whereby one of said reels may be unloaded while the other reel is in operation; substantially as described.

30. In a wire fabric machine, the combination with fabric-forming mechanism, of a shear arranged to shear the fabric into lengths while in motion, and a reeling device arranged to reel the fabric, said fabric forming mechanism, shear and reeling device being operatively connected together to work in unison whereby a continuous and simultaneous operation of the several mechanisms is afforded; substantially as described.

31. In a wire fabric machine, the combination with fabric-forming mechanism, of a shear arranged to shear the fabric into lengths while in motion, and a reeling device arranged to reel the fabric, said reeling device comprising a plurality of reels, and having means whereby one reel may be unloaded while another reel is in operation, said fabric forming mechanism, shear and reeling device being operatively connected together to work in unison whereby a continuous and consecutive operation of fabric forming, shearing, reeling and reel moving operations is afforded; substantially as described.

32. In a wire fabric machine, the combination of a pull-out drum having means for positively gripping alternate strand wires of the wire fabric, a shear device arranged to shear the fabric into lengths, means for periodically actuating the shear device to shear the fabric while the latter is in motion, and a reeling device having a plurality of reels any one of which may be brought into position to receive the fabric while the fabric is in motion, together with means for actuating the reels; substantially as described.

33. In a wire fabric machine, the combination with fabric-forming mechanism, of a shear arranged to shear the fabric while it is in motion, gearing for actuating the shear, timing mechanism for the gearing, a reeling device for the fabric having a plurality of reels, means for bringing said reels successively into reeling positions, and timing mechanism governing the operation of the reeling device and controlled in part through the timing mechanism for the shear; substantially as described.

34. In a wire fabric machine, the combination of a pull-out drum, a shear for cutting the fabric while in motion, a reeling device having a plurality of reels, any one of which may be brought into reeling position, and guiding and straightening means for the fabric intermediate of the shear and the reeling device; substantially as described.

35. In a wire fabric machine, the combination with fabric-forming mechanism, of a shear arranged to move forwardly with the fabric and having a movable shear blade, means for actuating said shear blade, timing mechanism for governing the cutting movements of the shear, said timing mechanism having means for varying the time intervals between cutting movements of the shear; substantially as described.

36. In a wire fabric machine, the combination with fabric-forming and shearing devices, of a rotatable reel carrier having a plurality of reels, means for actuating said carrier by a step by step movement, a timing device for controlling the operation of the reeling device, and means for varying the time of operations of the reeling device; substantially as described.

37. In a wire fabric machine, the combination with fabric-forming mechanism, of a rotatable reel carrier having a plurality of reels formed with an opening therethrough to receive the end of the fabric to be reeled, means for actuating the carrier by a step by step movement, and means for automatically bringing each of the reels into a proper position at the reeling station to present its opening to receive the end of the fabric; substantially as described.

38. In a wire fabric machine, in combination with fabric-forming mechanism, a rotatable reel carrier having a plurality of reels adapted to be successively brought into reeling position, means for actuating said carrier by a step by step movement, and gearing actuated by the movement of the reel carrier for turning the reels into proper initial position to receive the end of the fabric; substantially as described.

In testimony whereof, I have hereunto set my hand.

WILLIAM A. KILMER.

Witnesses:
T. D. TEMPLE,
W. L. THOMPSON.